US010260665B2

(12) United States Patent
Allevi et al.

(10) Patent No.: US 10,260,665 B2
(45) Date of Patent: Apr. 16, 2019

(54) FLUID TRANSMISSION COUPLER WITH REAR CHAMBER FED BY OBLIQUE PIPE

(71) Applicant: STUCCHI S.p.A., Brignano Gera d'Adda (BG) (IT)

(72) Inventors: Matteo Allevi, Missaglia (IT); Gianmarco Gatti, Pognano (IT); Giovanni Stucchi, Traviglio (IT); Sergio Tivelli, Cividate al Piano (IT)

(73) Assignee: STUCCHI S.P.A., Brignano Gera d'Adda (BG) (IT)

( * ) Notice: Subject to any disclaimer, the term of this patent is extended or adjusted under 35 U.S.C. 154(b) by 0 days.

(21) Appl. No.: 15/035,301

(22) PCT Filed: Nov. 10, 2014

(86) PCT No.: PCT/IB2014/065922
§ 371 (c)(1),
(2) Date: May 9, 2016

(87) PCT Pub. No.: WO2015/068141
PCT Pub. Date: May 14, 2015

(65) Prior Publication Data
US 2016/0281895 A1    Sep. 29, 2016

(30) Foreign Application Priority Data

Nov. 11, 2013 (IT) .............................. MI2013A1864

(51) Int. Cl.
| F16L 37/32 | (2006.01) |
| F16L 37/23 | (2006.01) |
| F16L 37/56 | (2006.01) |

(52) U.S. Cl.
CPC ............... *F16L 37/32* (2013.01); *F16L 37/23* (2013.01); *F16L 37/56* (2013.01)

(58) Field of Classification Search
CPC ..... Y10T 137/87957; Y10T 137/87973; Y10T 137/86919; Y10T 137/87161; F16L 37/32; F16L 37/56; F16L 37/35; F16L 37/23
(Continued)

(56) References Cited

U.S. PATENT DOCUMENTS

| 4,373,551 A | 2/1983 | Shindelar |
| 4,549,577 A | 10/1985 | Kugler |

(Continued)

OTHER PUBLICATIONS

International Search Report dated Jun. 9, 2015 in International Application No. PCT/IB2014/065922.
(Continued)

*Primary Examiner* — Michael R Reid
(74) *Attorney, Agent, or Firm* — Wenderoth, Lind & Ponack, L.L.P.

(57) ABSTRACT

A fluid transmission fitting (100) includes a female coupler (47) inserted within a hydraulic feeding block (1), and a male coupler (48), which can be coupled to the female coupler (47). The hydraulic feeding block (1) includes at least one hydraulic line (49) and a draining line (50), and a lever (4) integral with a cam (7) adapted to relieve the pressure from a chamber (54) inside the female coupler (47) and adapted to uncouple the male coupler (48) from the female coupler (47). The female coupler (47) including a pressure relief valve (51), which puts the chamber (54) into connection with the draining line (50).

3 Claims, 26 Drawing Sheets

(58) Field of Classification Search
USPC ...... 137/614.04, 614.06, 595, 627.5; 251/78, 251/231, 236, 243, 149.1, 149.9
See application file for complete search history.

(56) References Cited

U.S. PATENT DOCUMENTS

| | | | |
|---|---|---|---|
| 6,016,835 A | 1/2000 | Maldavs | |
| 6,145,539 A * | 11/2000 | Wilcox | F16L 37/23 137/614.03 |
| 2004/0124634 A1 | 7/2004 | Arosio | |
| 2006/0273580 A1 | 12/2006 | Marquis | |
| 2011/0254265 A1* | 10/2011 | Rusconi | F16L 37/32 285/317 |

OTHER PUBLICATIONS

Written Opinion of the International Preliminary Examining Authority dated Oct. 22, 2015 in International Application No. PCT/IB2014/065922.
International Preliminary Report on Patentability dated Feb. 9, 2016 in International Application No. PCT/IB2014/065922.

* cited by examiner

FLUID TRANSMISSION COUPLER WITH REAR CHAMBER FED BY OBLIQUE PIPE

BACKGROUND OF THE INVENTION

1. Technical Field

The present invention relates to a fluid transmission coupler having a rear chamber fed by an oblique pipe.

Fittings which may be rapidly coupled to one another to connect a fluid feed, by means of rigid pipes or flexible hoses, are frequently required for fluid transmission for example in operating machines and hydraulic equipment.

2. Description of the Related Art

The known quick coupling fittings usually consist of two couplers, named male and female, which are fastened to respective pipes to be joined and which can be coupled together by screwing or by snapping.

The aforesaid male and female couplers are formed by fixed parts and axially sliding parts, which at rest are arranged in a closing position of a fluid passage gap and during the coupling between two members are displaced by engaging with corresponding parts of the other member to an opening position of the passage gap.

The currently marketed fluid transmission solutions show that the coupling between the male coupler and the female coupler is not always very easy with effort increasing incrementally as the residual pressure present in the circuit increases.

Italian patent application MI2012A001254 by the present Applicant concerns a fluid transmission coupling that is connectable with constant effort provided with a pressure compensation and relief system, which is complex and not very cost-effective. The known fitting further comprises a central locking system, which is mechanically cumbersome and ineffective in some situations of accidental actuation by the user.

U.S. Pat. No. 6,016,835 and US-2006/0273580 describe a fluid transmission fitting with a female coupler having a rear chamber fed by a pipe having an axis parallel to the fitting axis.

SUMMARY OF THE INVENTION

It is the object of the present invention to make a pipe fitting, in which the effort required for the coupling operation is minimal and independent from the residual pressure present in the circuit.

It is a further object of the present invention to make the fitting mechanically simpler and allow a suitable hydraulic control to guarantee user safety in the event of accidental actuation.

A further object of is that the fitting has a rear chamber which, when pressurized, allows the main valve of the female coupler to be maintained in position by opposing the thrust of the fluid coming from the male coupler, thus guaranteeing the complete opening of valves after coupling the coupler.

BRIEF DESCRIPTION OF THE DRAWINGS

The features of the present invention will be more apparent from the following detailed description of a non-limitative example thereof shown in the accompanying drawings, in which.

DETAILED DESCRIPTION OF THE INVENTION

Figure 1:
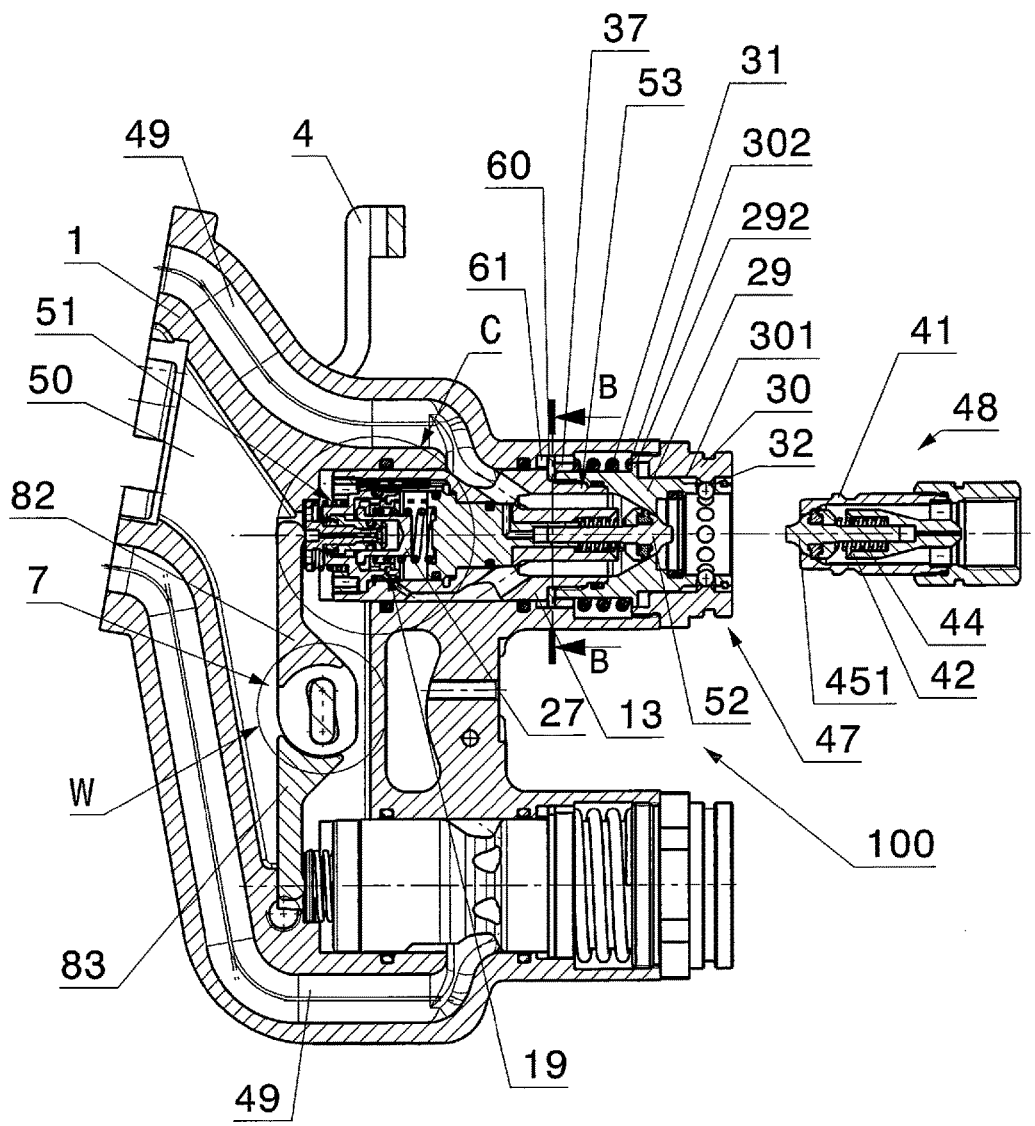
FIG. 1 is a sectional view taken along line I-I in FIG. 24 of a fluid transmission fitting with uncoupled male and female coupler.

FIG. 1 shows a coupling fitting 100 comprising a female valve coupler 47 inserted in a hydraulic feeding block 1 and a male valve coupler 48, which can be coupled to the female coupler 47.

The block 1, which feeds the fluid, comprises at least one hydraulic line 49 and a draining line 50, both interfacing with one or more female couplers 47.

In the description of the operation, reference will be made to only one male-female line (the one shown on the top in the drawings), but the considerations are applicable to all lines of a same fitting. It is worth noting that in the drawings the female coupler in the lower line is not shown in section but only as a view, the section being identical to that of the upper line.

The block 1 further comprises a lever 4 integral with a cam 7 adapted to relieve the pressure from a chamber 54 inside the female coupler 47, and adapted to uncouple the male coupler 48 from the female coupler 47.

The cam 7 consists of two independent parts, an upper one 82, which acts on the coupling of the upper hydraulic line, and a lower one 83, which acts on the coupling of the lower hydraulic line (FIG. 1)

Figure 16:
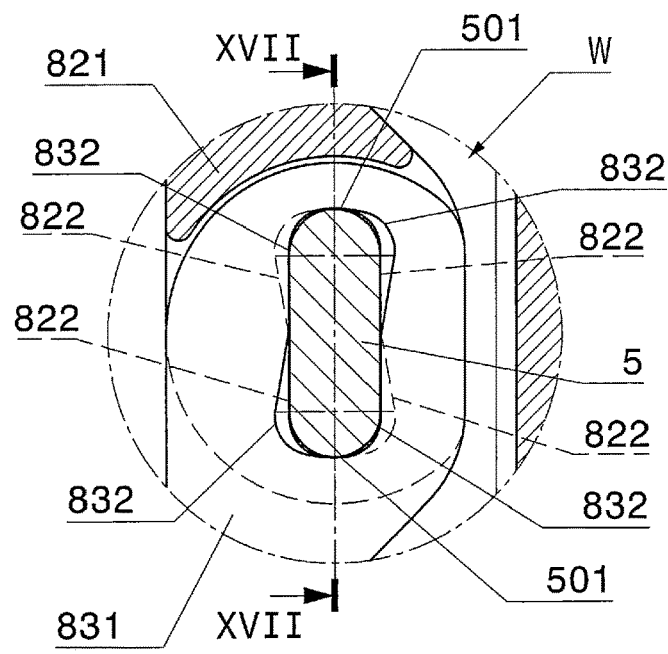
FIG. 16 is an enlarged detailed view of the content of circle W in FIG. 1.
Figure 17:
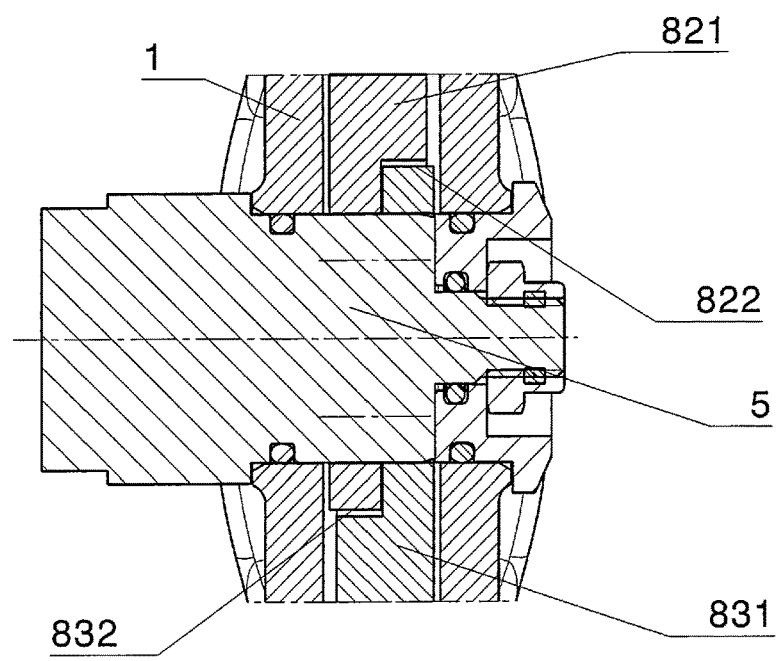
FIG. 17 is a sectional view taken along line XVII-XVII in FIG. 16.

The cams 82, 83 each have a disc-shaped attachment portion 821, 831 (FIGS. 16-23) assembled on a central shaft 5 with a substantially rectangular section with rounded short sides 501 (FIG. 16) so as to allow the rotation of the shaft 5 in loops 822, 832 of the attachment portions 821, 831.

The rotation of the central shaft 5 is controlled by applying stress to the lever 4, which moves the attachment portion 821 of the upper cam 82 clockwise, but being free in the second loop 832 it does not move the attachment portion 831 of the lower cam 83, and moves the attachment portion 831 of the lower cam 83 anticlockwise but by being free in the loop 822 it does not move the attachment portion 821 of the upper cam 82.

The shape of the loops 822, 832 is substantially complementary to the shape of the central shaft 5, but their width is greater to allow a rotation clearance such to be able to move one cam 82 while maintaining the other 83 stationary, and vice versa, as will be more apparent below.

The cams 82, 83 are held in position by means of a stop of the block 1 and the head of the shutter 25, which is pushed, in turn, into position by the spring 84. The central shaft 5 is integral with the lever 4, in turn.

The female coupler 47 comprises a pressure relief valve 51, which puts the chamber 54 into communication with the draining line 50 (FIG. 1).

the valve 51 comprises a valve body 23, which forms a housing for a sliding shutter 25, stressed by a spring 84, which reacts against a protrusion of the head of the shutter 25 and a valve body 23.

The valve body 23 also contains a hollow body 72, which integrally surrounds an inner portion of the shutter 25.

Figure 1A:
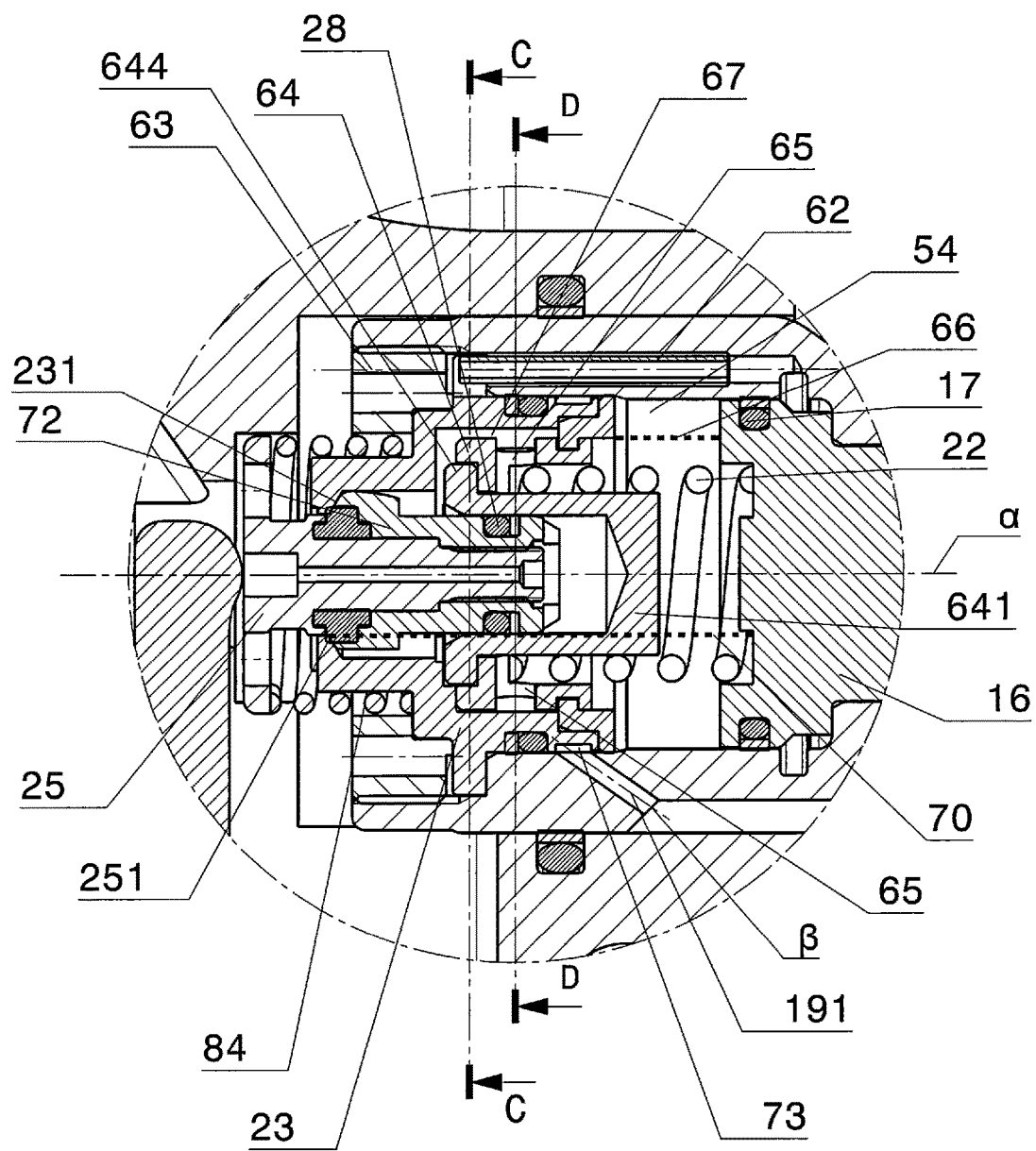
FIG. 1A is an enlarged detailed view comprised in circle C in FIG. 1.

The sealing is ensured by the contact between a seal 251 of the shutter 25 and a conical seat 231 of the valve body 23 (FIG. 1A).

The member 72 has an annular portion 721 with three cavities at 120° for the passage of the fluid and is in contact with the seal 251, which co-operates to seal the body valve 23.

Between the upper cam 82 and the head of the shutter 25 there is a slight clearance to guarantee that the shutter is in the closed position when the cam 7 is not actuated.

The shutter 25 has therein a hole 252 (FIG. 2) for venting the air and a hydraulic thrust section reduced to the minimum. Such a hydraulic thrust section is determined by the interface diameter between the sealing diameter of the seal 251 and the valve body 23, and by the diameter of slightly smaller size of the member 72 on which a seal 28 acts. The described configuration of the shutter 25—valve body 23 coupling allows to minimize the actuation force of the shutter 25 itself in the presence of residual pressure present inside the chamber 54.

The female coupler 47 further comprises a valve 52 axially sliding inside an outer assembly 53 of the female coupler 47 itself, and a seal 19 adapted to generate a pressure difference between the hydraulic line 49 and the chamber 54.

Figure 2:
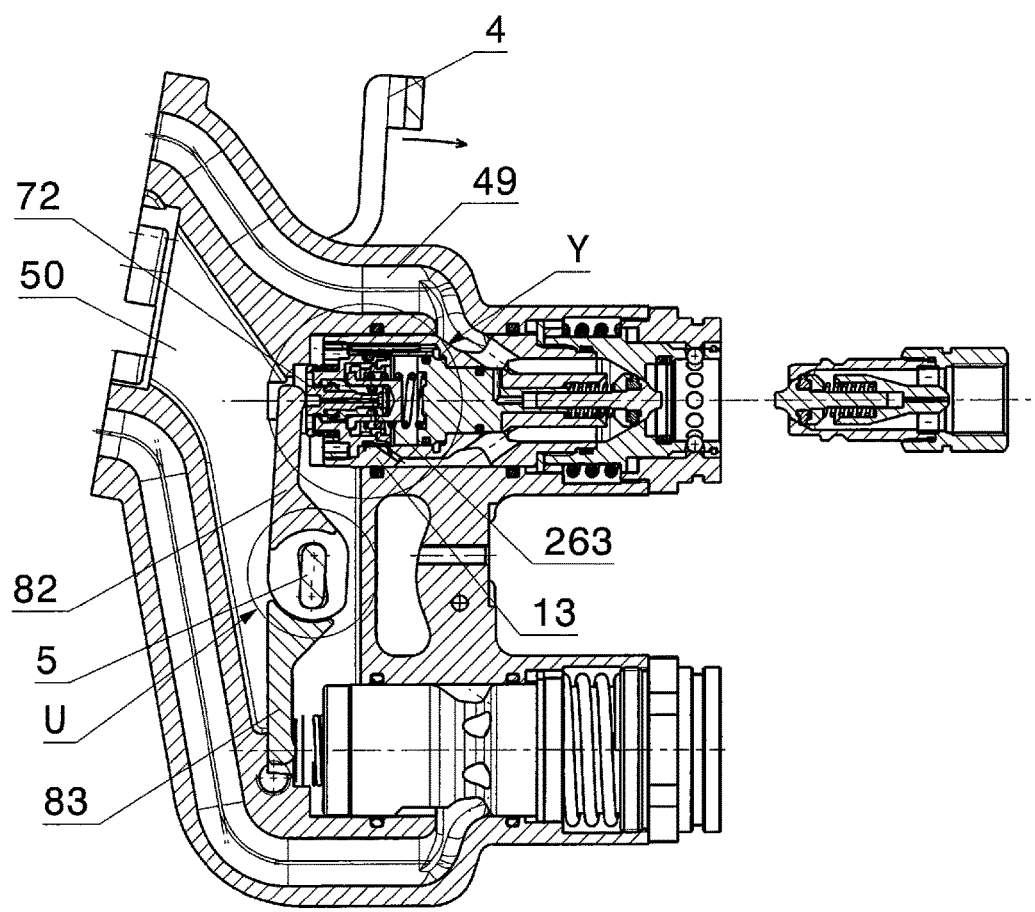
FIG. 2 is a sectional view similar to the one in FIG. 1 of the fitting in a step of relieving the residual pressure of the hydraulic line before the coupling between male coupler and female coupler.
Figure 2A:
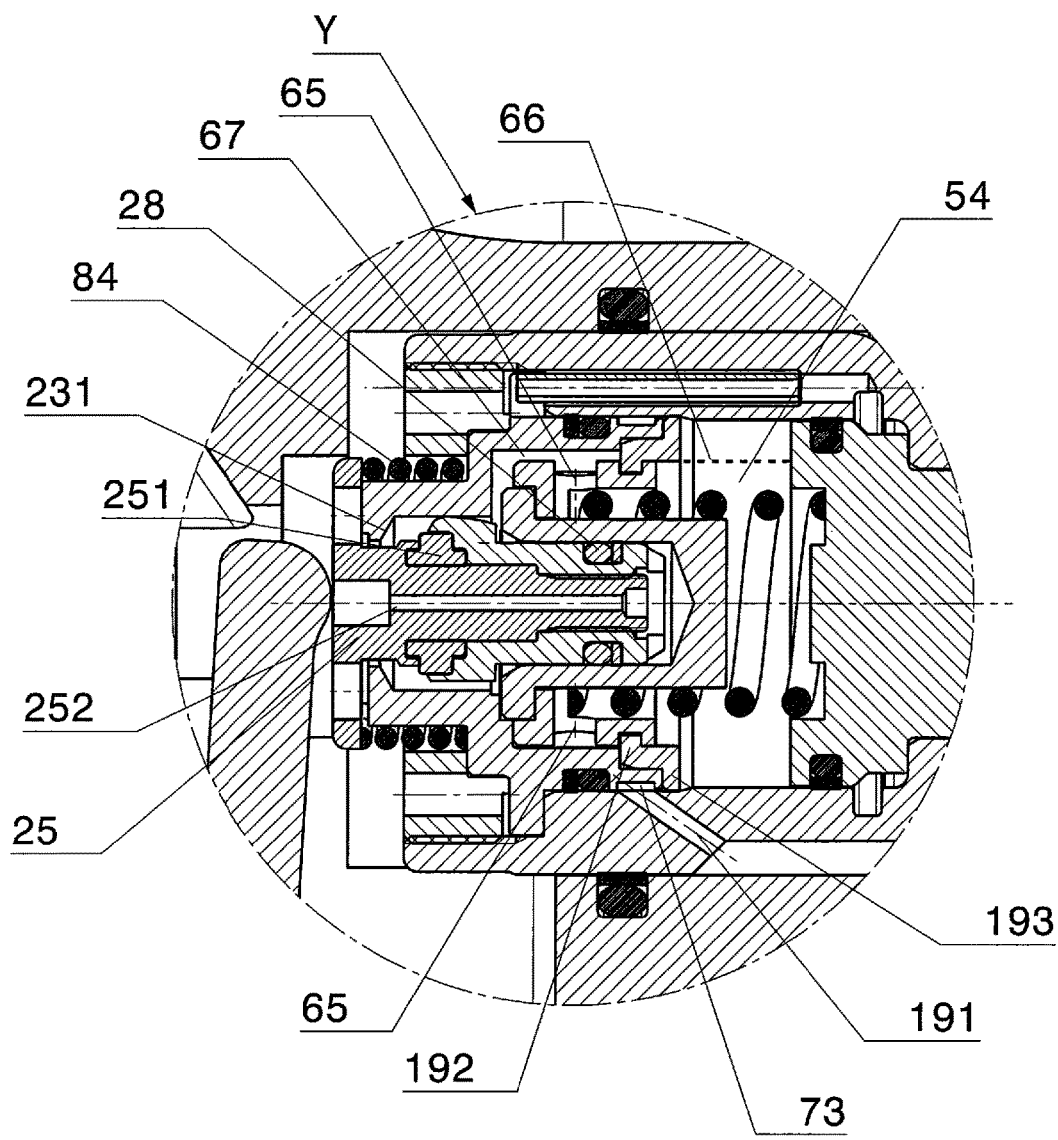
FIG. 2A is an enlarged detailed view comprised in circle Y in FIG. 2.
Figure 3:
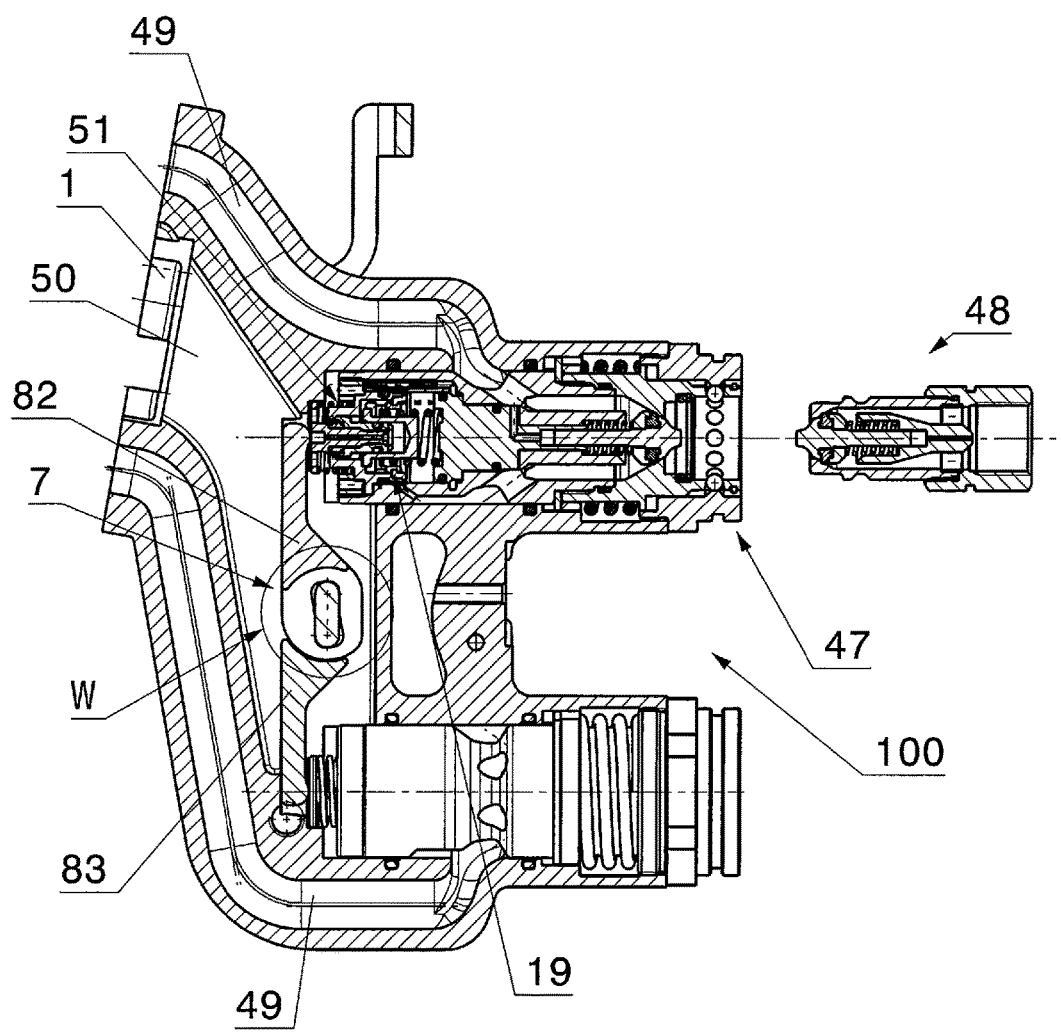
FIG. 3 is a sectional view similar to the one in FIG. 1 of the fitting before the coupling between male coupler and female coupler without the presence of residual pressure in the hydraulic line.

The seal 19 is adapted to close a calibrated communication pipe 191 between the chamber 54 and the hydraulic line 49; and the pipe 191 is contained in a body 13 external to the chamber 54 with respect to the axis α of the fitting 100 (FIG. 2).

The seal 19 is ring-shaped, determines a radial type sealing, i.e. orthogonal to the axis α of the fitting 100, and comprises a non-deformable portion 192 and a deformable portion 193 (detail Y in FIG. 2).

The pipe 191 is external to the chamber 54 and the pressurized fluid flow inside it insists radially outwards from the inside of the chamber 54 at an annular gap 73 extending on the entire circumference of the valve body 23 (detail C in FIG. 1).

Furthermore, it is worth noting that the pipe 191 is oblique, i.e. has axis β oblique with respect to the axis α of the fitting 100 thus determining a sealing of the radial type of the seal 19 inwards from the outside towards the axis α of the fitting 100.

The chamber 54 is comprised between the bottom 16 by means of the seal 17 and the conical seat of the valve body 231 by means of the seal 251 placed on the shutter 25 (detail C in FIG. 1).

When actuated by the cam 82, the shutter 25 opens and releases the fluid from the chamber 54 to the draining line 50. A ring 64 is placed within the chamber 54, which supports a seal 19 and is externally integral with a hollow body 641 in which the shutter 25 slides with a member 72. The sealing is guaranteed here by the seal 28.

The hollow body 641 is axially stressed by a spring 22 and has a ring-shaped end 644 where the ring 64 rests.

The ring 64, in addition to having the function of supporting the seal 19 also has the function of making the fluid pass through holes 65 only in the upper side of the chamber 54 by virtue of the fact that there is a cavity 67 for passing only in that point (FIG. 1A).

Indeed, the ring 64 abuts on the bottom on the valve body 23, while the cavity 67, which keeps the ring 64 and the valve body 23 at distance without contact, remains on the top. It is thus apparent that the valve body 23 is asymmetric to allow the passage of fluid only on top, so as to limit the emptying of the chamber 54.

The cavity 67 on the upper top side of the chamber 54, is opposed by 180° with respect to the fluid inlet pipe 191, which, as mentioned, is placed on the lower side of the chamber 54.

Figure 1B:
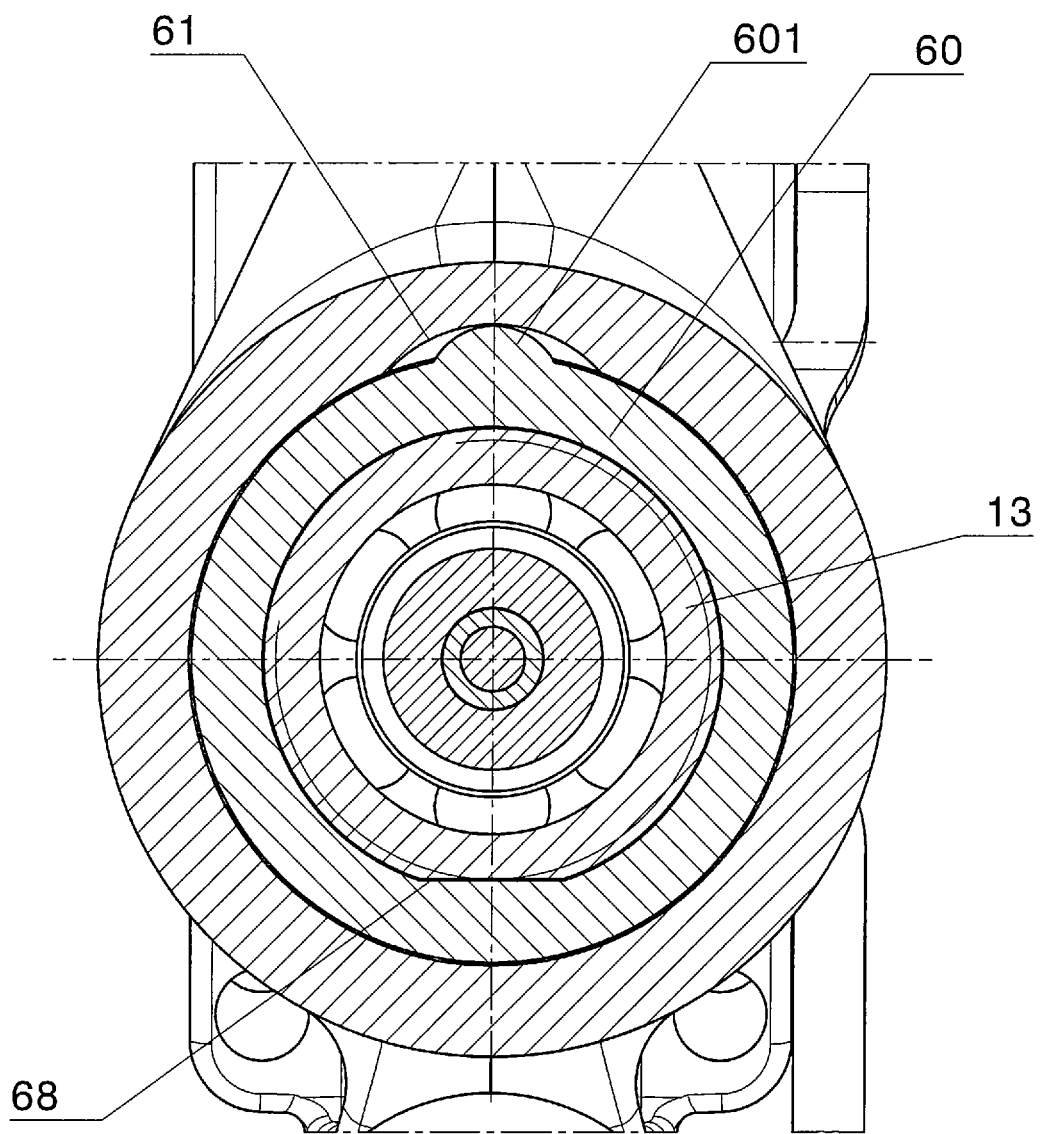
FIG. 1B is a sectional view taken along line B-B in FIG. 1.
Figure 1C:
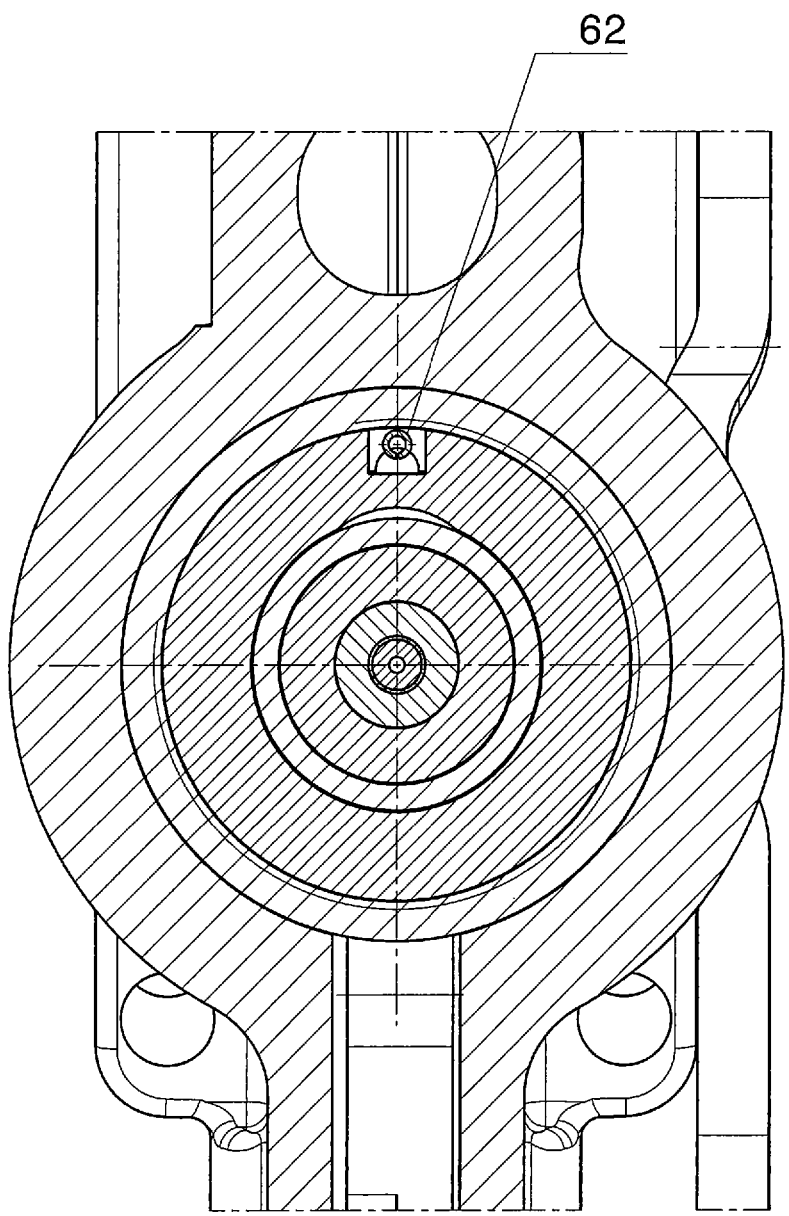
FIG. 1C is a sectional view taken along line C-C in FIG. 1A.
Figure 1D:
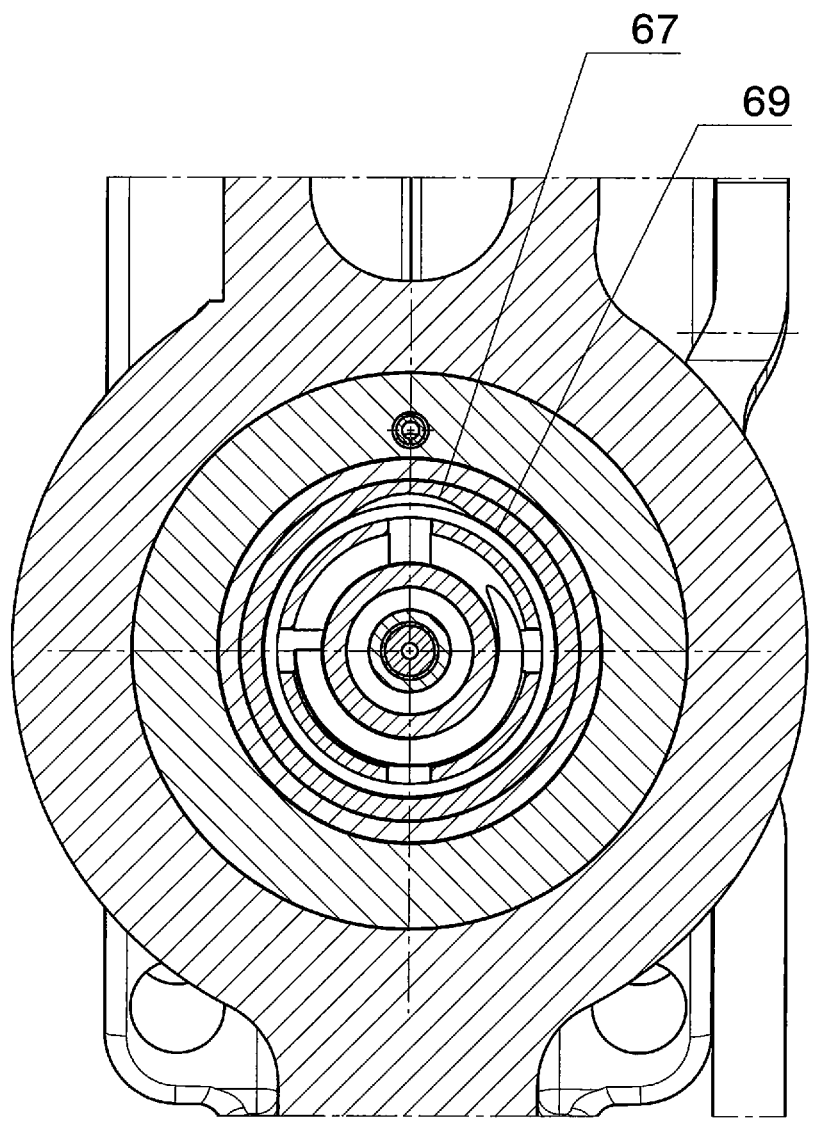
FIG. 1D is a sectional view taken along line D-D in FIG. 1A.

The position of the cavity 67 with respect to the pipe 191 is guaranteed for the timing of the valve body 23 with the body 13 by means of a pin 62 (FIG. 1C) and a timing ring 60 (FIG. 1B), which has a timing surface 68 which interacts with the body 13.

The timing ring 60 also allows the timing with respect to the block 1, because it comprises a timing protrusion 601 adapted to couple with a timing seat 61 of the block 1.

The body valve 23 is locked by the ring nut 63. Functionally, the fluid enters into the chamber 54 from the bottom by means of the pipe 191 and after having opened the shutter 25 exits from the top through the cavity 67 always keeping the chamber filled to a level 66 corresponding to the diameter 69 of the valve body 23. In absence of the system described above, once the shutter 25 opens, the fluid would pass from the chamber 54 to the draining line 50 emptying the chamber 54 to level 70 (detail C in FIG. 1). Keeping the chamber 54 filled with fluid to level 66 has the advantage of limiting the presence of air, and thus the chamber full of fluid is incompressible and the bottom 16 is held in position as shown below. A further advantage is that by having the chamber 54 full of fluid to level 66, its complete filling is faster, particularly when the fluid arrives from male coupler to female coupler.

When a given nominal pressure of the hydraulic line 49 is reached, the fluid passes through the pipe 191, enters into the annular gap 73, is distributed on the entire circumference and makes the deformable portion 193 bend towards the inside of the chamber 54, thus determining the entrance of pressurized fluid into the chamber 54 from the hydraulic line 49. When the pressure returns under the nominal pressure, the deformable portion 193 returns to its initial position, thus obstructing the passage of fluid in the opposite direction. The features of the chamber 54 and of the seal 19 described above can be used with identical operating principle also in the case of flat-faced male-female couplers.

The outer assembly 53 (FIG. 1) comprises a ring nut holder 29, a ring nut 30 and at least one locking ball 32 arranged inside a housing of the ring nut holder 29. A spring 31, by reacting against appropriate protrusions 292, 302, against the ring nut 30, the spacer 37 and the ring 60, constrains the outer assembly 53 in a central resting position, which guarantees the locking of the male coupler 48 after the coupling.

A bottom 16 also slides inside the female coupler 47 and has two seals 14 and 17 (FIG. 9) on the side of the hydraulic line 49 and on that of the chamber 54, respectively. The zone comprised between the two seals 14, 17 is in contact with the draining line 50 by means of the pipe 56. The bottom 16 is held in position by a spring 22.

The male coupler 48 is shown, in turn, in FIG. 1 and comprises a threaded male body 41 for connecting to a user (not shown), e.g. to a hydraulic equipment. There is a valve 451 held in position by a spring 44, which acts on a bottom 42 within the male body 41. Such a valve 451 guarantees the sealing of the male coupler 48 in an uncoupled condition.

Figure 18:
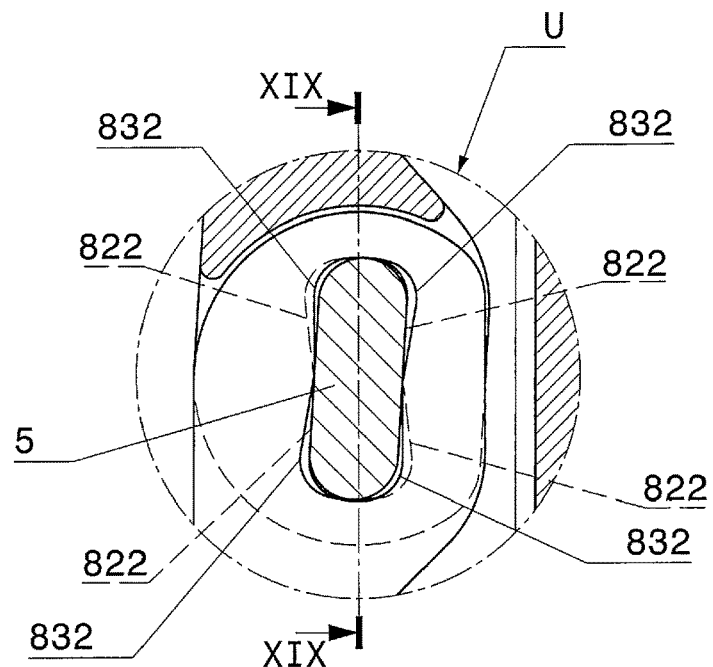
FIG. 18 is an enlarged detailed view of the content of circle U in FIG. 2.
Figure 19:
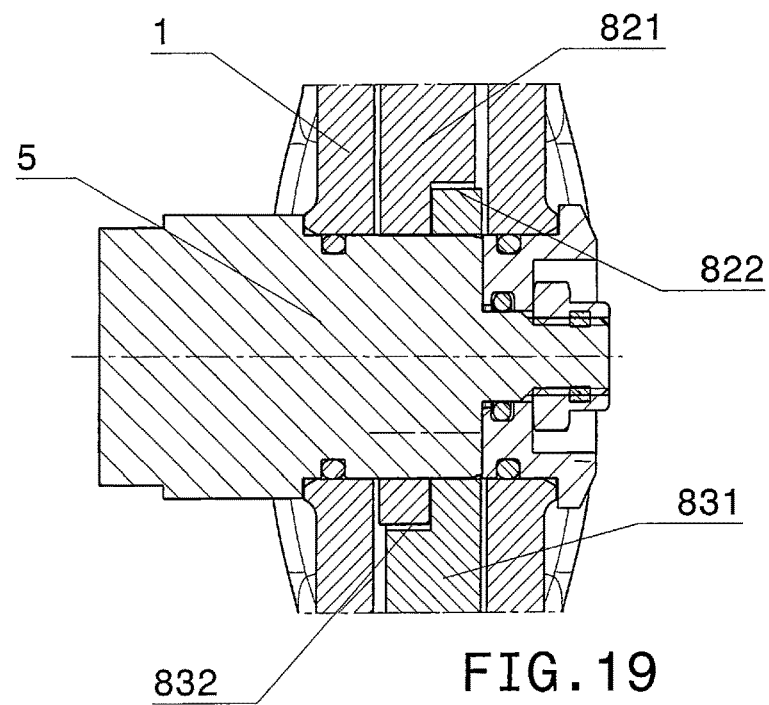
FIG. 19 is a sectional view taken along line XIX-XIX in FIG. 18.

Residual pressure may be present in one or more of the hydraulic lines 49 in operation. By moving the lever 4 rightwards, the upper cam 82 is actuated and pushes the head of the shutter 25, putting the hydraulic line 49 into connection with the draining line 50 allowing relief of the inner residual pressure (FIG. 2). During such a function, the seal 19 is deformed at the deformable portion 193 allowing the passage of fluid through the pipe 191. From the hydraulic line 49 to the draining line 50, the fluid always passes through the chamber 54 in the cavity 67 placed on the upper side, thus maintaining the chamber 54 always full of fluid to level 66. During this step, the lower cam 83 does not move because the shaft 5 by rotating rightwards meets a side of the loop 822 of the upper cam 82 feeding it, while the loop 832 of the attachment portion 831 is sufficiently wide to make the shaft 5 rotate without touching any of its sides (FIGS. 18-19).

The force applied by the lever 4 must be such to overcome the resistance of the spring 84, which holds the shutter 25 in position.

Having relieved the residual pressure inside the line 49, the system is ready for coupling.

Figure 4:
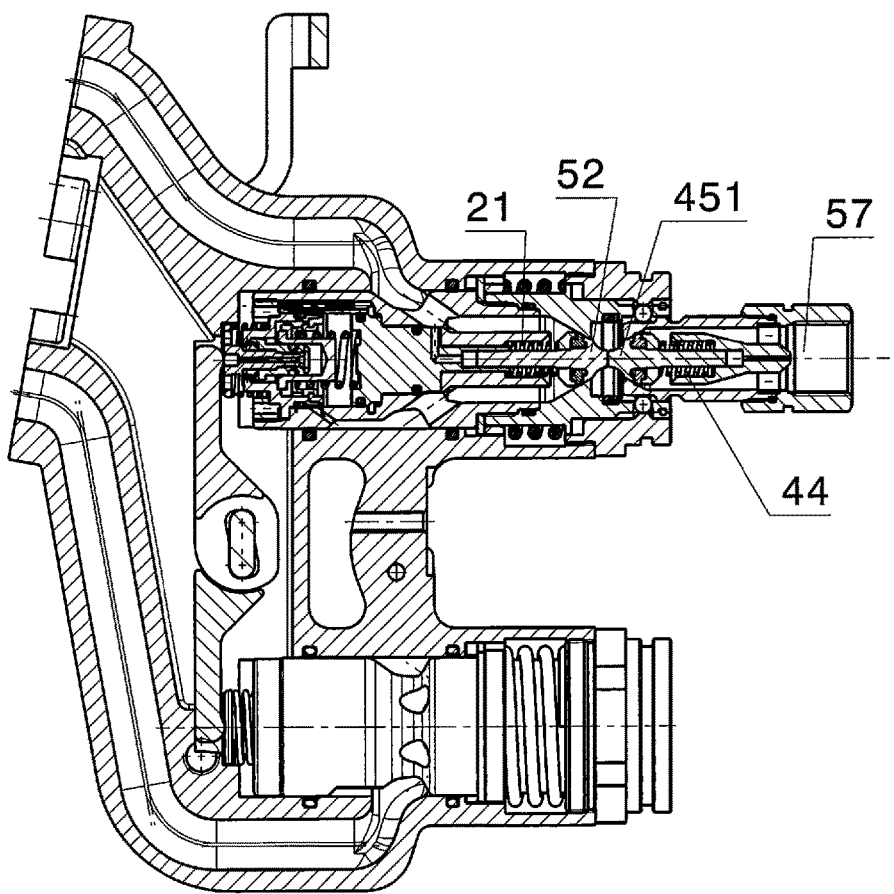
FIG. 4 is a sectional view similar to the one in FIG. 1 of the fitting in a first step of coupling between male coupler and female coupler, with contact of a valve of the male coupler and a valve of the female coupler.
Figure 5:
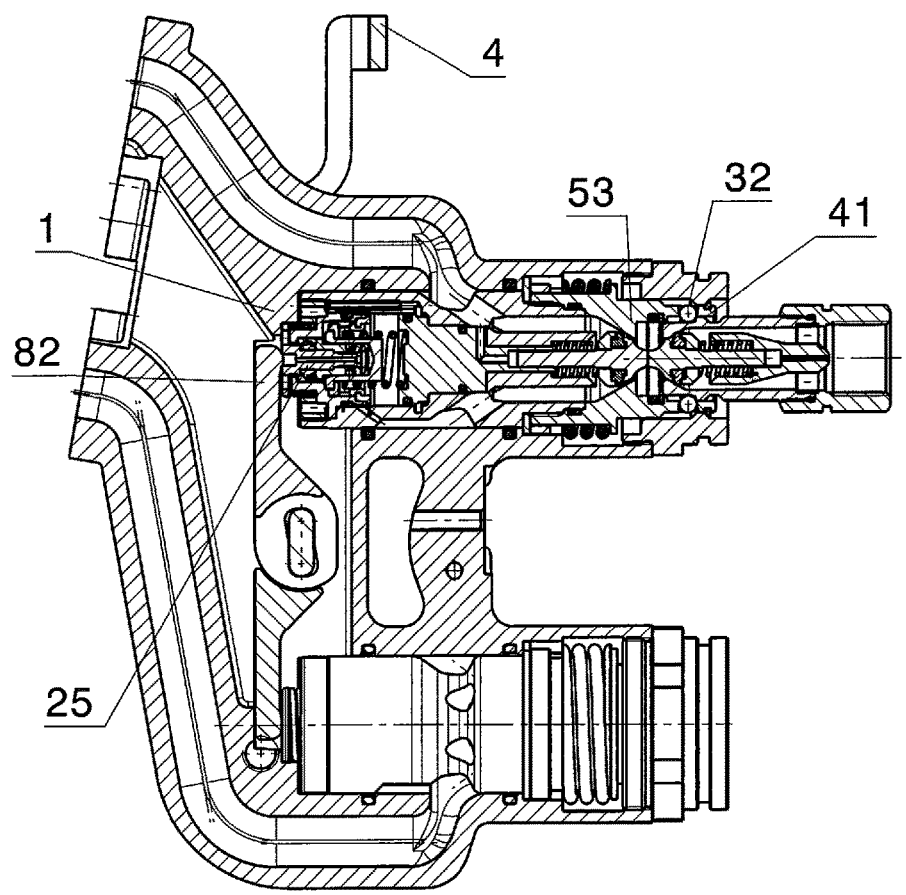
FIG. 5 is a sectional view similar to that in FIG. 1 of the fitting in a second step of coupling between male coupler and female coupler, with displacement of the inner part of the female coupler in the hydraulic feeding block and opening of the rear pressure relief.

The first coupling step (FIG. 4) consists in pushing the male coupler 48 into the female coupler 47. Residual pressure may be present in the chamber 57 upstream of the valve 451. The valve 451 comes into contact with the valve 52 by approaching the male coupler 48 to the female coupler 47. In the absence of residual pressure in the chamber 57, the load of the springs 21 and 44 is equivalent and both valves 451, 52 are displaced. Only valve 52 is displaced in the case of pressure in the chamber 57. By pushing the male coupler 48 into the female coupler 47, the male body 41 goes into contact with the balls 32, thus displacing the outer assembly 53 into the block 1 (FIG. 5). During the displacement, the head of the shutter 25 goes into contact with the upper cam 82, which, in turn, goes into contact with the block 1. Thus, the shutter 25 opens and turns the hydraulic line 49 into an open circuit. This function allows relief of the pressure during coupling even if the lever 4 is not operated in advance. The upper cam 82 is not free to move with the shutter 25 in the opening position.

Figure 6:
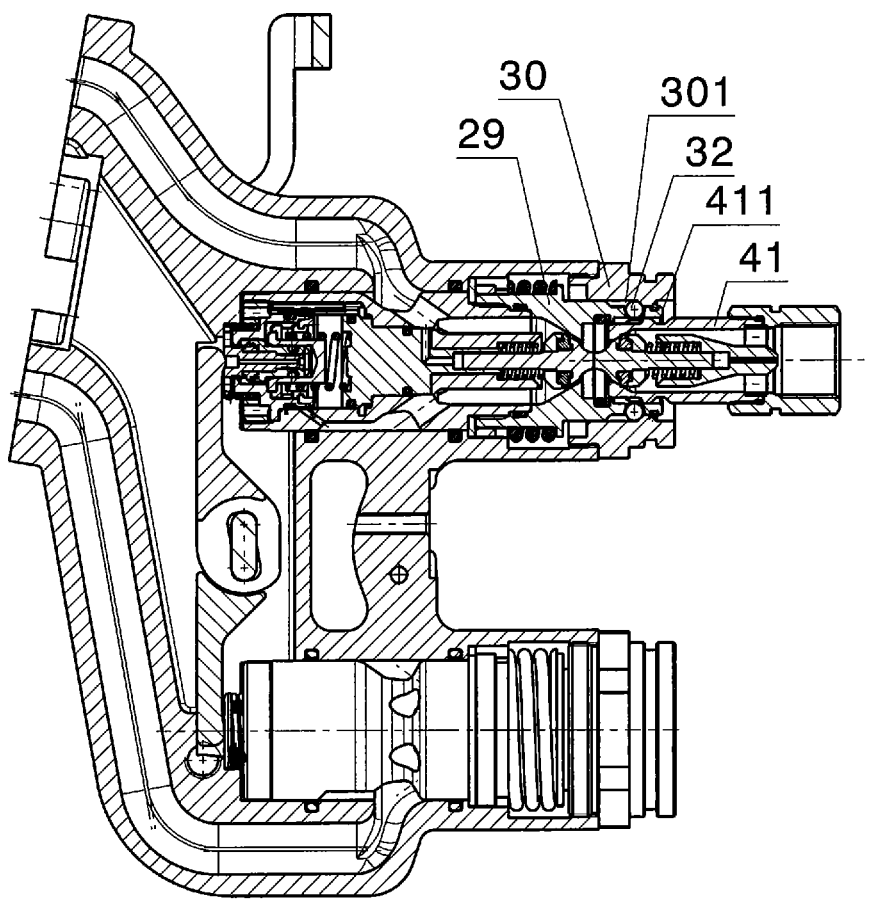
FIGS. 6 and 7 are sectional views similar to the one in FIG. 1 of the fitting in a third and a fourth step of coupling between male coupler and female coupler with radial displacement of the locking balls of the female coupler in the housing of a fixing ring nut.
Figure 7:
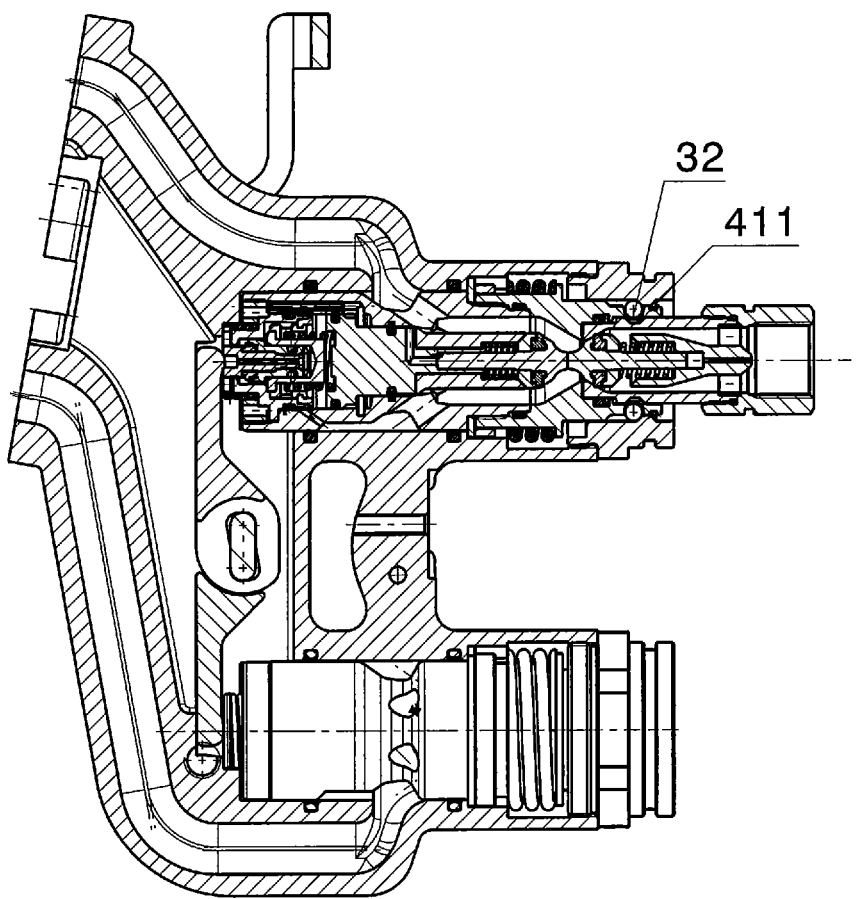
Figure 8:
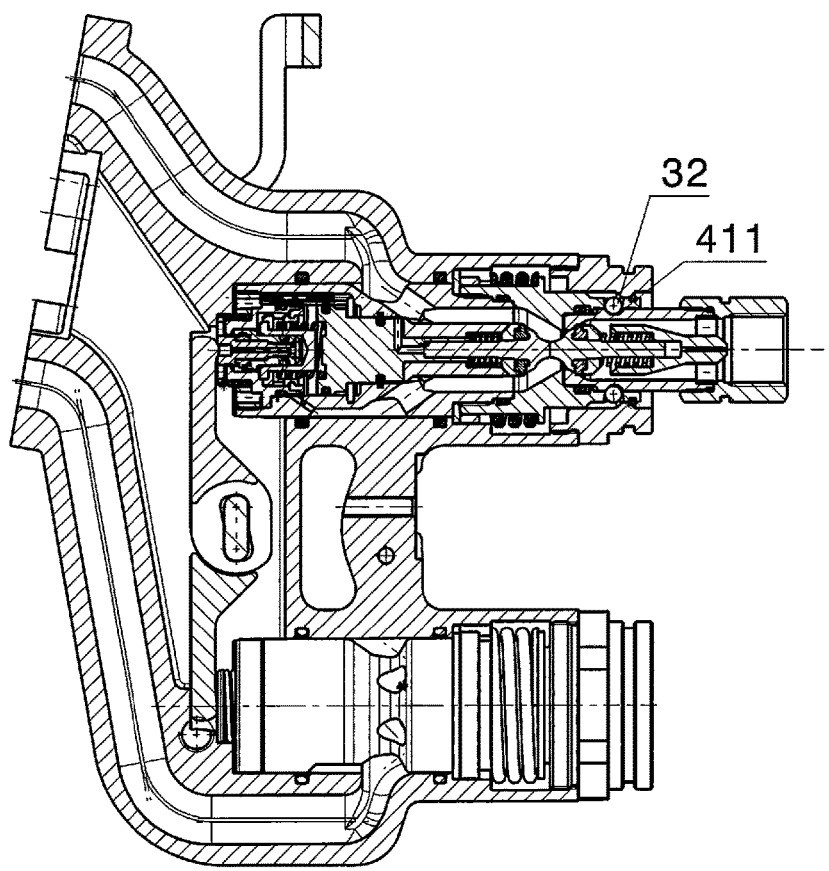
FIG. 8 is a similar view to the one in FIG. 1 of the fitting in a fifth step of coupling between male coupler and female coupler, with positioning of the locking balls within a recess present on the male body.
Figure 9:
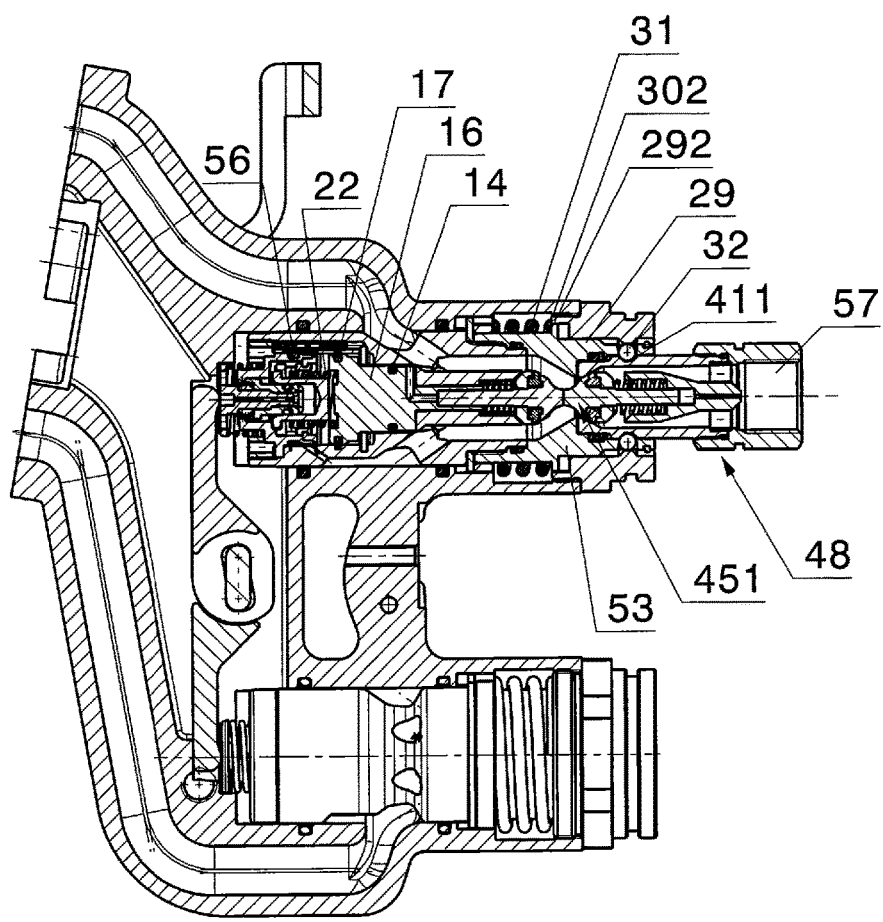
FIG. 9 is a similar view to the one in FIG. 1 of the fitting in a sixth step of coupling between male coupler and female coupler, with displacement of the outer assembly with locking balls to the locking position of the male coupler.

Proceeding with the insertion of the male coupler 48 in the female coupler 47 (FIGS. 6-7), the locking balls 32 enter into the seat 301 of the ring nut 30, thus allowing the entrance of the male coupler 48 until the locking balls 32 fall into the cavity 411 obtained in the male body 41 (FIGS. 8-9).

In this position, the spring 31 returns the assembly consisting of the outer assembly 53 and the male coupler 48 to the coupled balanced position by working on the shoulder 292 of the lock ring holder 29 (FIG. 9). In the case of absence of pressure in the chamber 57, as mentioned above, the bottom 16 is not moved and is held in position by the spring 22, and the valve 451 is retracted; in this case the circuit is open and the coupler is coupled as shown in FIG. 9.

The bottom 16 retracts instead in the case of pressure in the chamber 57.

The manual mechanical coupling operation is complete at this point; the male coupler 48 is mechanically coupled to the female coupler 47, but by virtue of the fact that the bottom 16 was moved towards the inside of the female coupler 47, the valve 451 which retains the residual pressure of the male coupler 48 is still not open. Thus, the effort required for the coupling operation is independent from the residual pressure present inside the male coupler 48 because it does not work on the valves, which retain the residual pressure.

For opening the valve 451, in the case of pressure in the chamber 57, it is necessary to send a pressure pulse from the hydraulic line 49, which by passing through the pipe 191 deforms the deformable portion 193 of the seal 19, fills the chamber 54 and pushes the bottom 16 which acts on the valve 52, which opens the valve 451, the thrust section of the bottom 16 being higher than that of the valve 451. During the movement of the bottom 16, the air contained in the chamber between the seals 17 and 14 may enter and exit through the pipe 56 (FIG. 10).

Figure 10:
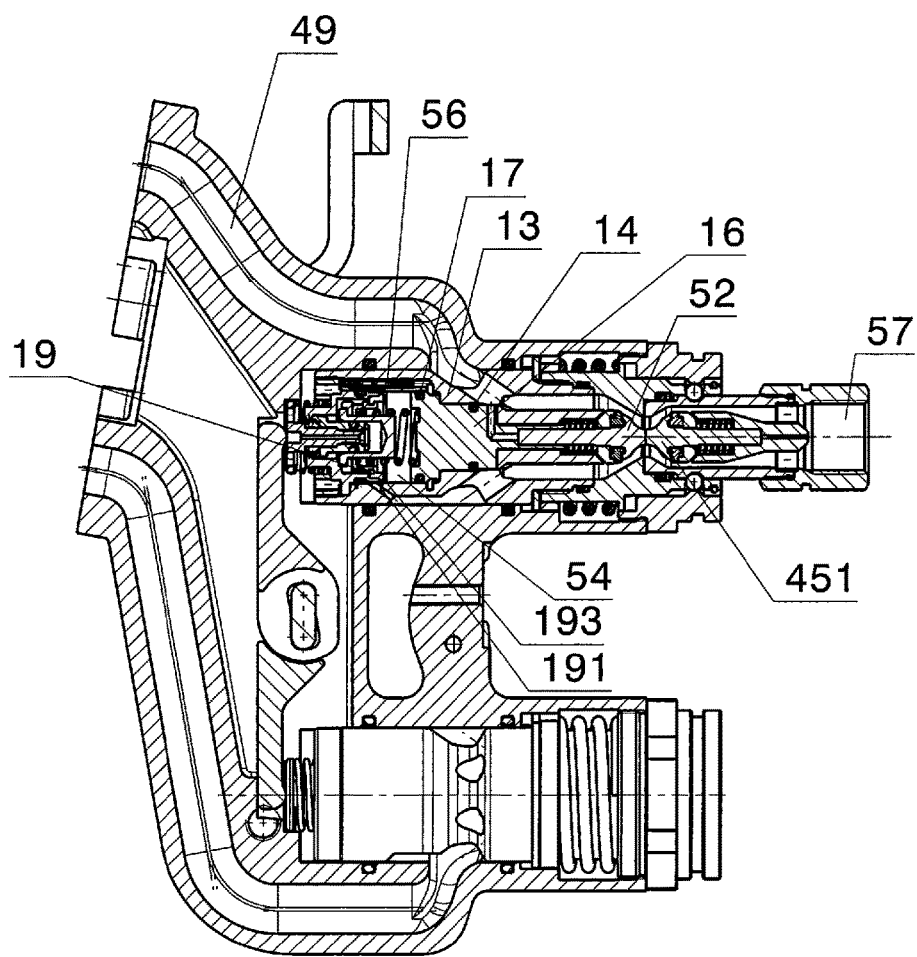
FIG. 10 is a sectional view similar to the one in FIG. 1 of the fitting in a seventh step of coupling between male coupler and female coupler, with opening of the male valve by effect of the hydraulic thrust caused by the feeding of the circuit.

The circuit totally opens when the bottom 16 abuts on the body 13 (again in FIG. 10). By virtue of the fact that the chamber 54 is always kept at nearly full level 66 to minimize the presence of compressible air, once filled with pressurized oil the movement of the bottom 16 is no longer permitted except for a movement of the shutter 25 because the seal 19 does not allow the return of fluid towards the hydraulic line 49. The presence of compressible air would make the bottom 16 retract and consequently close the valve 451 of the male coupler 48.

Figure 11:
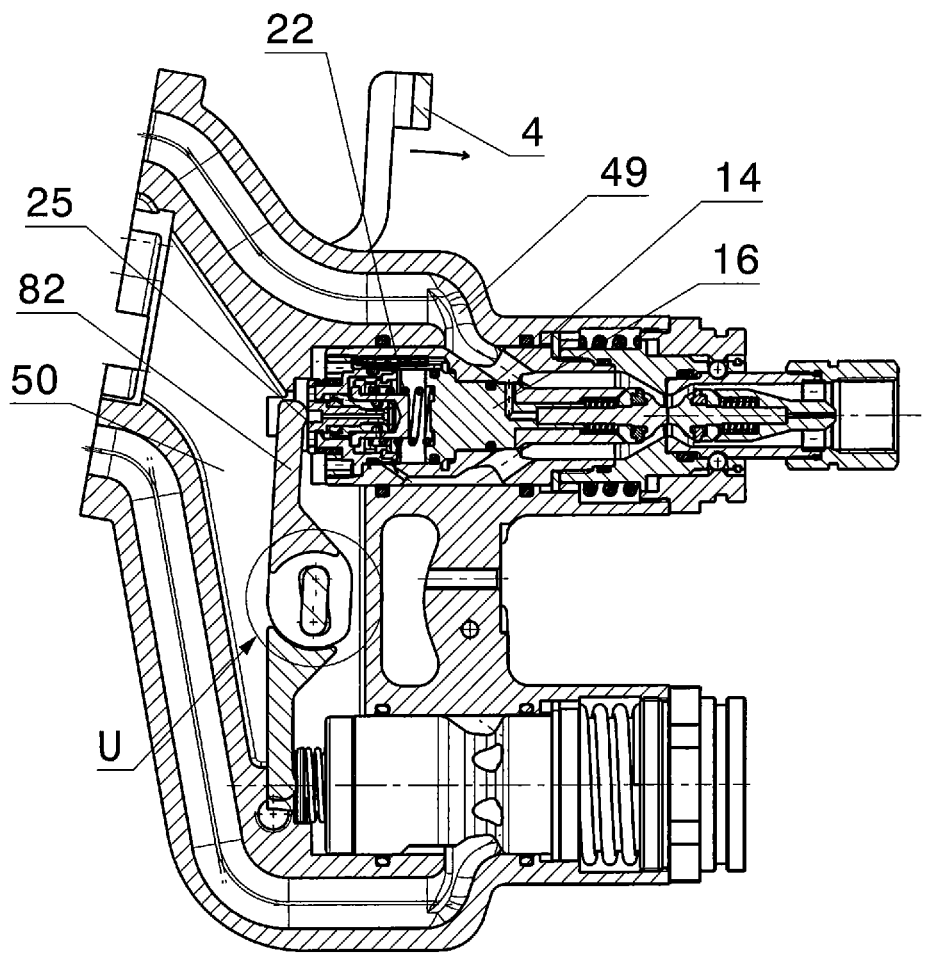
FIGS. 11 and 12 are sectional views similar to the one in FIG. 1 of the fitting in a first and a second step of uncoupling between male coupler and female coupler, with pressure relief and closing of the male valve.
Figure 12:
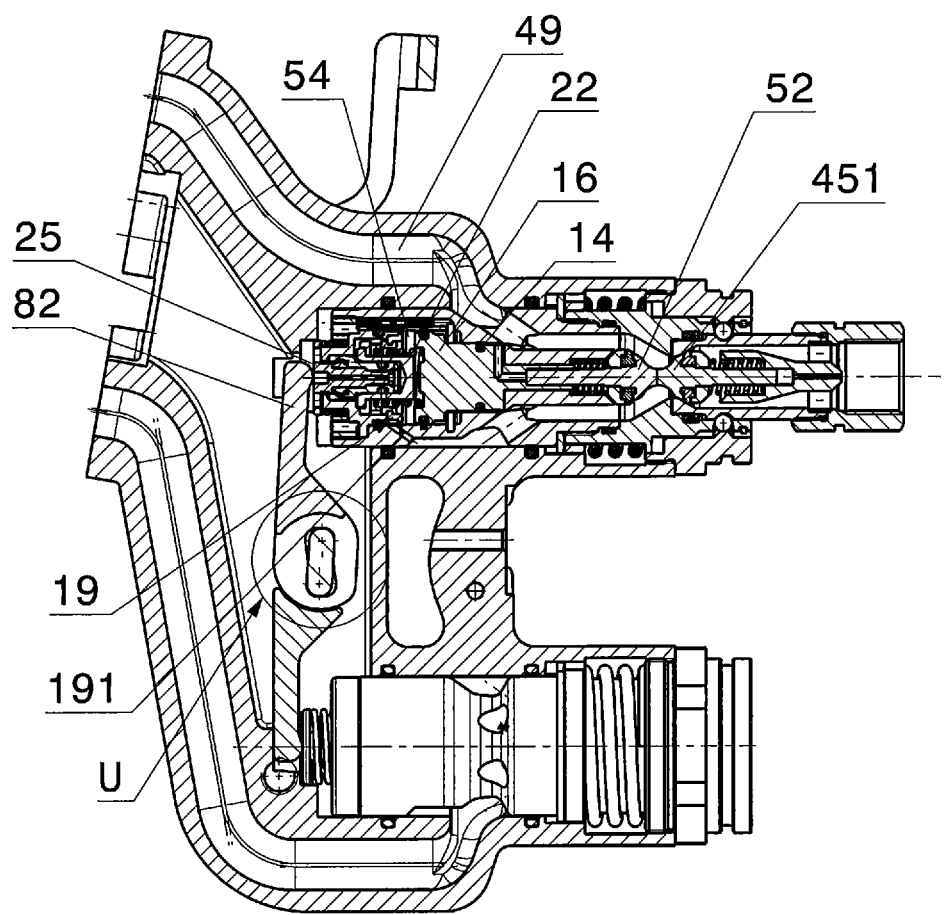

The uncoupling between male coupler 48 and female coupler 47 starts by acting on the lever 4 (FIG. 11) which moves the upper cam 82, according to the same methods as the initial relieving described above and shown in FIGS. 2, 18 and 19, which acts on the head of the shutter 25 putting the hydraulic line 49 into communication with the draining line 50, thus discharging the pressure inside them. In the case of pressure and possible flow in the hydraulic line 49 (e.g. caused by a load applied upstream of the male coupler), by actuating the shutter 25 there is a drop of pressure in the chamber 54, while the presence of the seal 19 and of the calibrated pipe 191 causes a higher pressure in the hydraulic line 49, which acts on the seal 14 causing a thrust on the bottom 16, which overcomes the spring 22 and thus moves the bottom 16 itself, the valve 52 and the valve 451 which close (FIG. 12).

Figure 13:
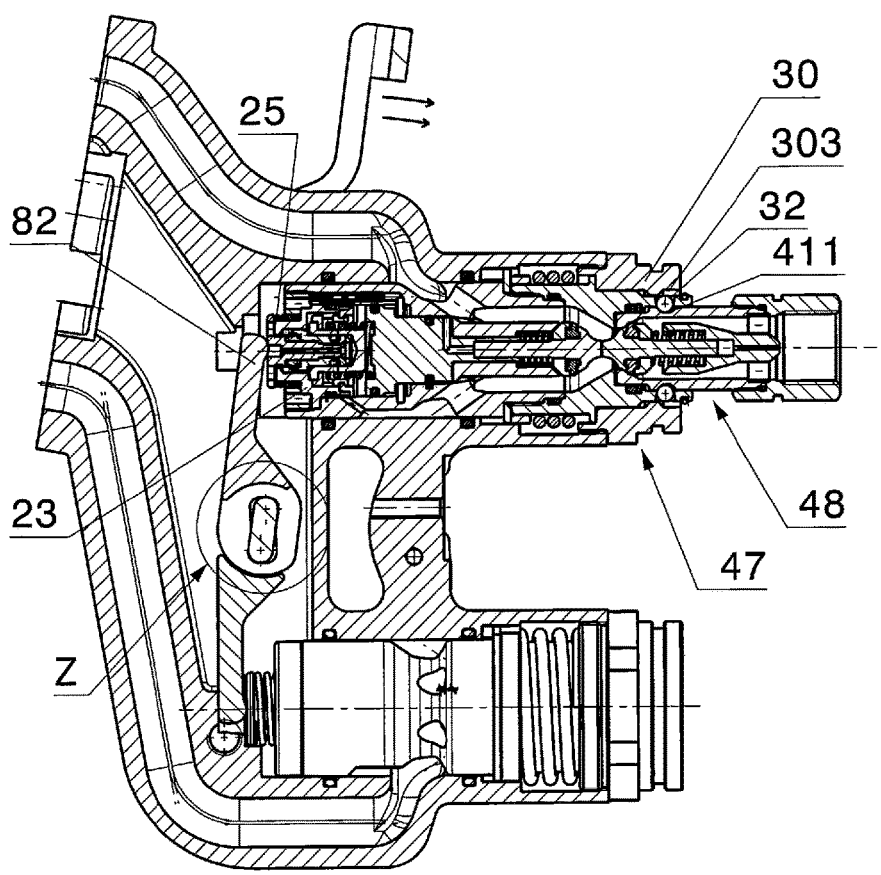
FIG. 13 is a sectional view similar to the one in FIG. 1 of the fitting in a third step of uncoupling between male coupler and female coupler, with displacement of the inner parts until the locking balls are released.
Figure 14:
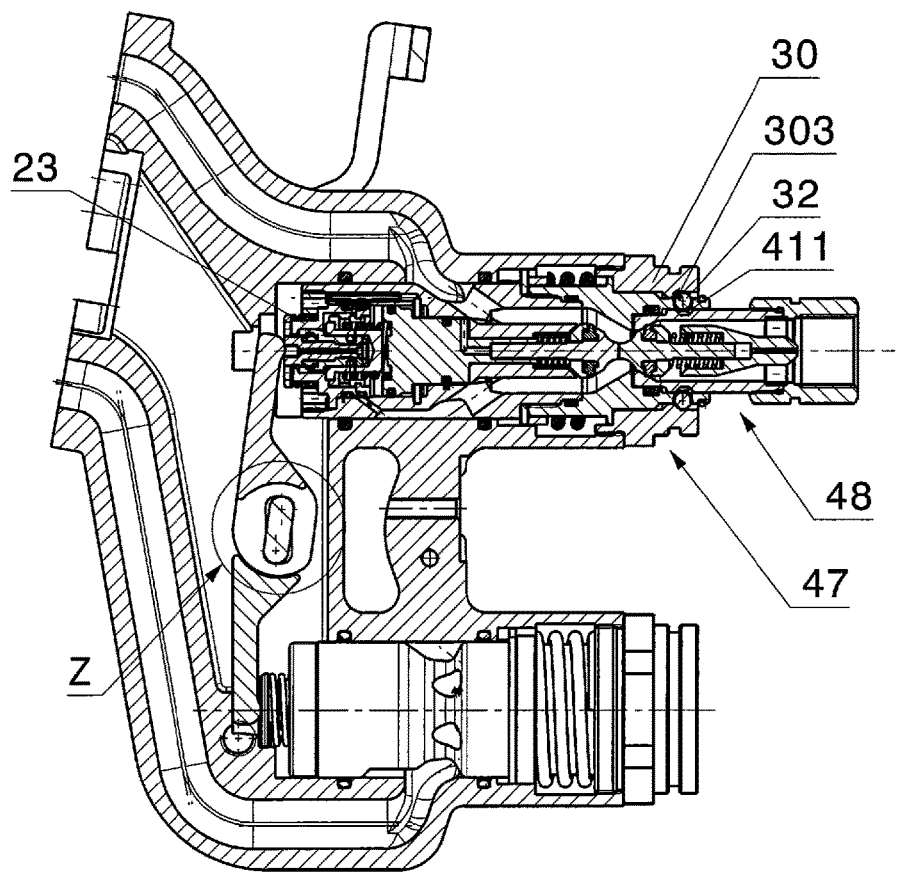
FIG. 14 is a sectional view similar to the one in FIG. 1 of the fitting in a fourth step of uncoupling between male coupler and female coupler, with releasing of the male coupler.

Continuing the movement, the upper cam 82 pushes the head of the shutter to act on the valve body 23, which in turn moves the whole formed by female coupler 47 and male coupler 48 outwards to the locking balls 32 with the recess 303 on the fixing ring nut 30. In such a position, the locking balls 32 exit from the recess 411 in the male body 41 and release it letting it out (FIGS. 13-14).

Figure 20:
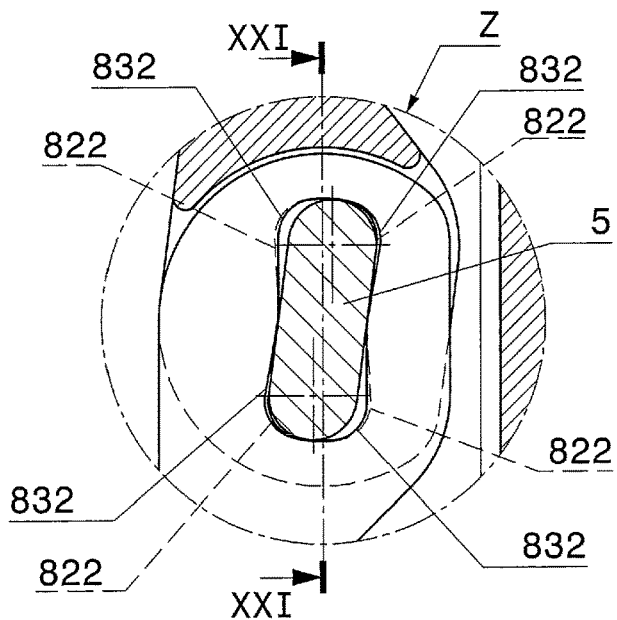
FIG. 20 is an enlarged detailed view of the content of circle Z in FIG. 13.
Figure 21:
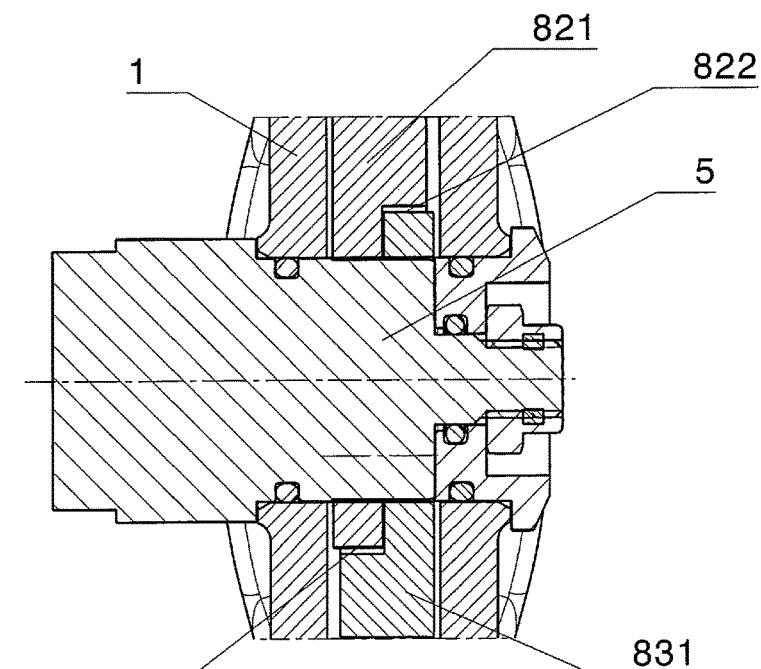
FIG. 21 is a sectional view taken along line XXI-XXI in FIG. 20.
Figure 22:
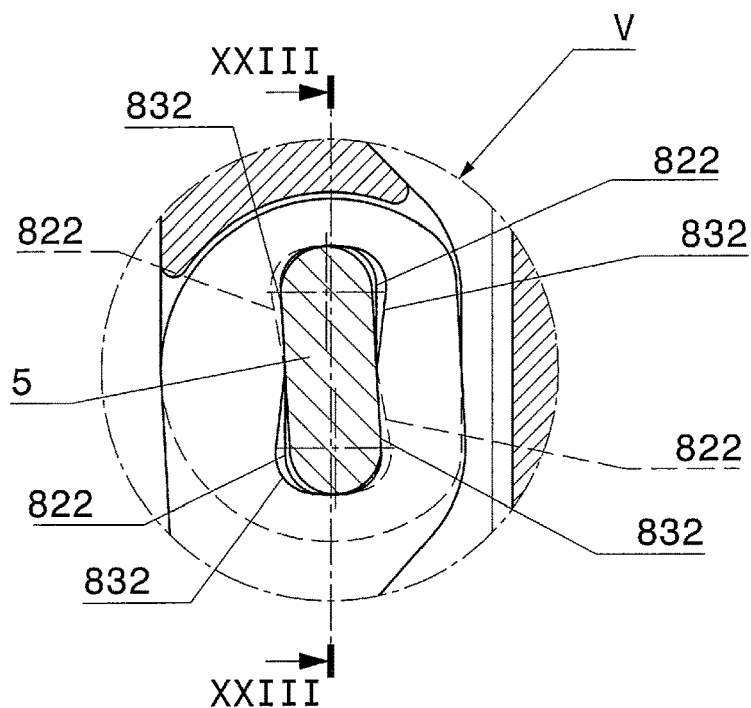
FIG. 22 is an enlarged detailed view of the content of circle V in FIG. 25.
Figure 23:
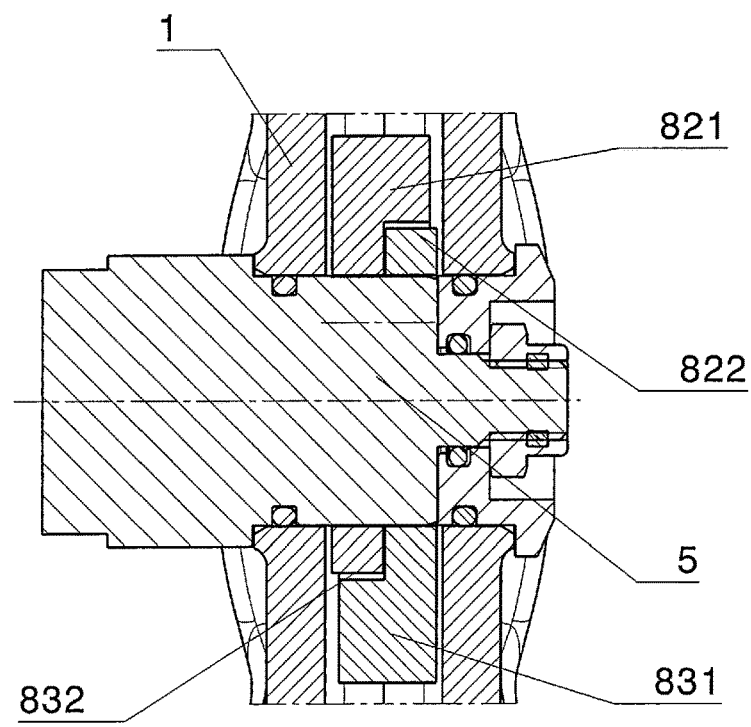
FIG. 23 is a sectional view taken along line XXIII-XXIII in FIG. 22.
Figure 24:
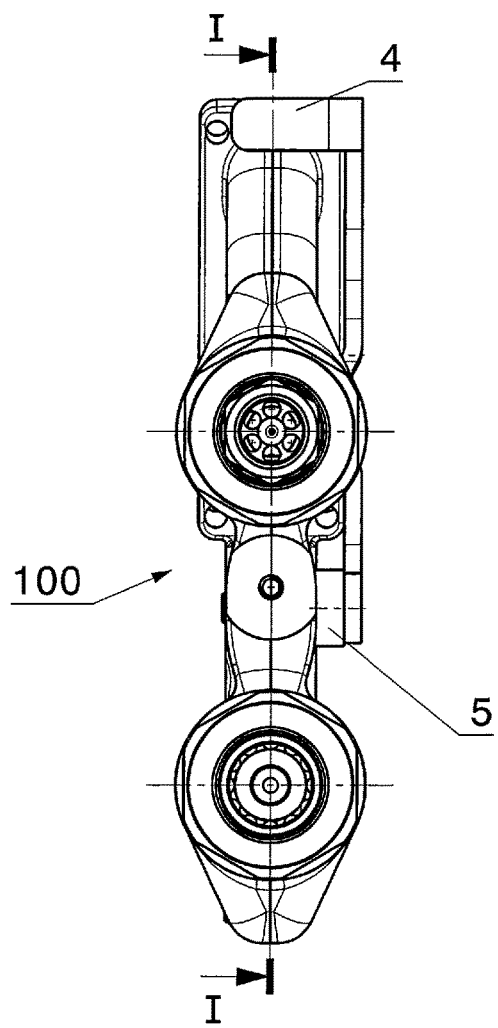
FIG. 24 is a front view of the fitting according to the present invention.
Figure 25:
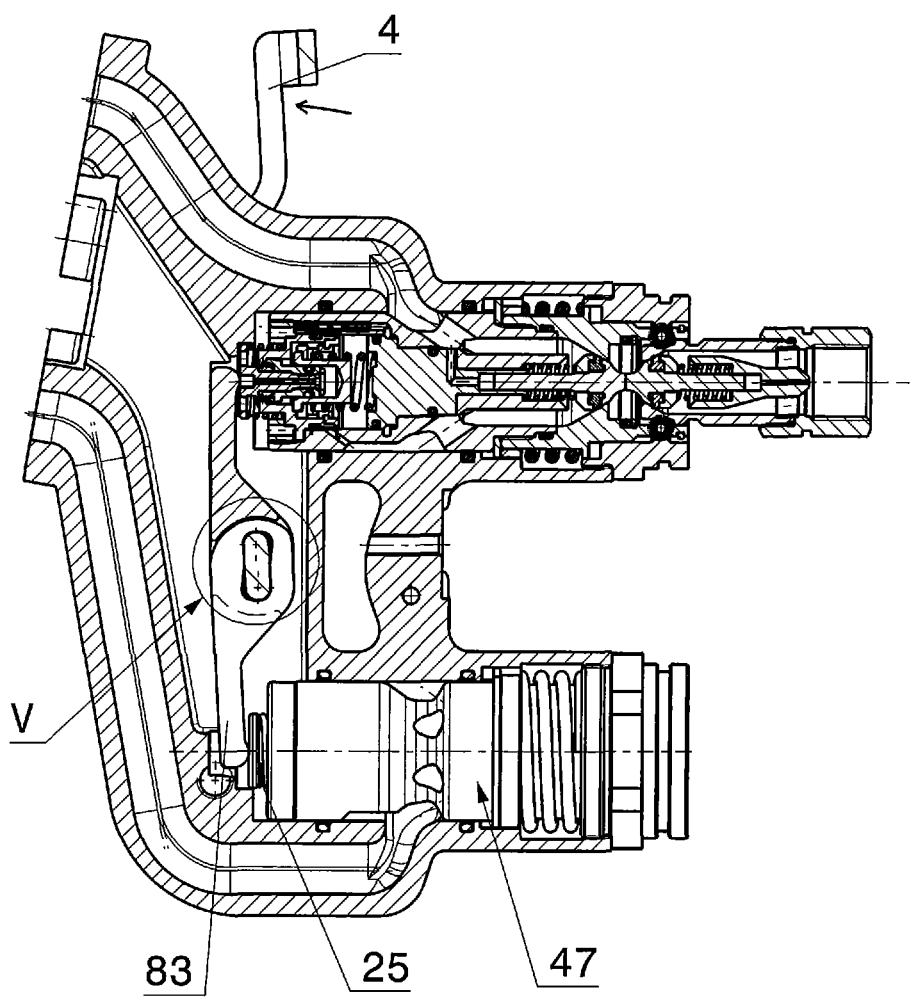
FIG. 25 is a sectional view similar to the one in FIG. 1 of the fitting in a step of relieving of the residual pressure before the coupling between male coupler and female coupler of the lower hydraulic line.

It is worth noting that the loop 832 of the lower cam 83 is sufficiently wide to allow a double movement of the upper cam 82 at the end of the second movement, the shaft 5 nearly abutting onto a side of the loop 832 (FIGS. 20-21).

Figure 15:
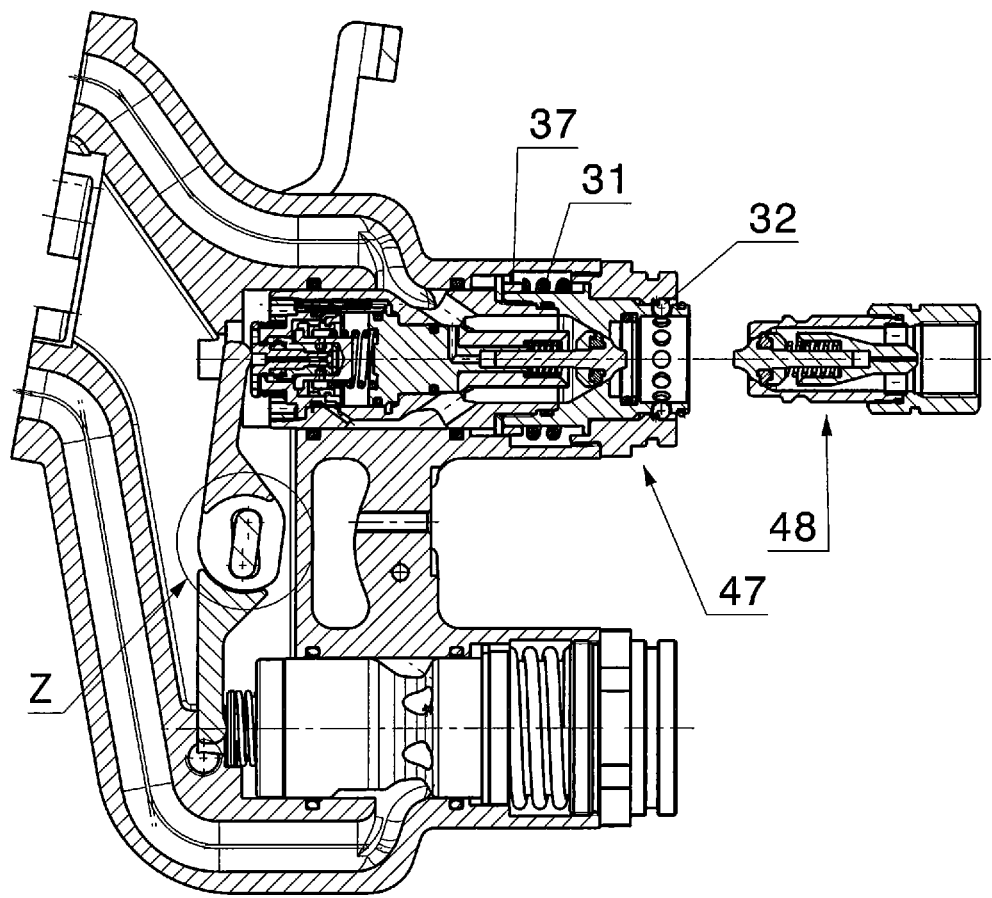
FIG. 15 is a sectional view similar to the one in FIG. 1 of the fitting, with male coupler and female coupler uncoupled.

The unrestrained male coupler 48 is uncoupled by effect of the thrust of the inner springs. Having released the balls 32, the spring 31 returns the female coupler 47 to the resting position by working on the spacer 37 (FIGS. 15 and 1).

The system is ready for a new connection.

The female coupler 47 coupled by means of the locking balls 32 is fed outwards when coupled, if the male coupler 48 is pulled. When the locking balls 32 reach the recess 303 of the ring nut 30, the male coupler 48 is uncoupled (accidental uncoupling, "breakaway" function).

The engagement of the lower line is similar to that of the upper line it being worth noting that the lever 4 moves leftwards in opposite sense (FIG. 27): the interaction between the shaft 5 and the attachment portion 831 of the lower cam 83 is similar to that described above for the attachment portion 821 of the upper cam 82, in which the loop 822 allows the rotation of the attachment portion 831 of the lower cam 83 without moving the upper cam 82.

The invention claimed is:

1. A fluid transmission coupling assembly comprising a female coupler inserted in a hydraulic feeding block belonging to the assembly, and a male coupler adapted to be coupled with said female coupler,
   said block including at least one hydraulic line and a draining line, and a lever integral with a cam adapted to relieve pressure from a chamber inside the female coupler and adapted to uncouple the male coupler from the female coupler,
   said female coupler comprising a pressure relief valve, which puts said chamber into communication with the draining line, said pressure relief valve including a valve body, and
   a seal adapted to close a calibrated communication pipe between the chamber and the hydraulic line,
   said calibrated communication pipe being contained in a body of the female coupler external to said chamber with respect to an axis ($\alpha$) of the assembly, thus generating a pressure difference between the hydraulic line and the chamber,
   said calibrated communication pipe being external to said chamber and having an oblique axis ($\beta$) with respect to the axis ($\alpha$) of the fluid transmission coupling assembly,
   said seal having an annular shape, and comprising a non-deformable portion and a deformable portion, the deformable portion bending towards the inside of the chamber when a given nominal pressure is reached, thus determining the entrance of the pressurized fluid in the chamber of the hydraulic line and the deformable portion returning to its initial position thus obstructing the passage of fluid when the pressure returns under said nominal pressure,
   wherein said calibrated communication pipe leads into an annular gap formed in an outer circumferential surface of the valve body of said pressure relief valve so as to protect the seal from direct flow from the calibrated communication pipe.

2. The fluid transmission coupling assembly according to claim 1, wherein the valve body of said pressure relief valve forms a housing for a sliding shutter and for a first hollow body which surrounds and is supported on an inner portion of the sliding shutter, and a spring that reacts against a protrusion of a head of the sliding shutter and the valve body of said pressure relief valve,
   said seal being supported by a ring placed within said chamber, said ring being supported on an outer surface of a second hollow body within which the shutter slides with said first hollow body.

3. The fluid coupling assembly according to claim 1, wherein said annular gap directs the flow exiting under pressure from a mouth of the calibrated communication pipe along a circumference of the annular gap towards the deformable portion of the seal which by bending towards the inside of the chamber makes the fluid pass from the hydraulic line to the chamber.

\* \* \* \* \*